United States Patent
Huffman et al.

(10) Patent No.: US 10,250,748 B1
(45) Date of Patent: *Apr. 2, 2019

(54) SYSTEM AND METHOD FOR UNIFIED CALLING

(71) Applicant: JPMorgan Chase Bank, N.A., New York, NY (US)

(72) Inventors: Mark Huffman, Sanford, FL (US); Robert O'Reilly, Nazareth, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/813,180

(22) Filed: Jul. 30, 2015

Related U.S. Application Data

(63) Continuation of application No. 13/446,173, filed on Apr. 13, 2012, now Pat. No. 9,124,700.

(60) Provisional application No. 61/592,042, filed on Jan. 30, 2012.

(51) Int. Cl.
*H04M 3/51* (2006.01)

(52) U.S. Cl.
CPC ....... *H04M 3/5141* (2013.01); *H04M 3/5158* (2013.01); *H04M 3/5183* (2013.01)

(58) Field of Classification Search
USPC .................................................... 379/265.09
See application file for complete search history.

(56) References Cited

U.S. PATENT DOCUMENTS

| | | | |
|---|---|---|---|
| 5,479,487 A * | 12/1995 | Hammond | H04M 3/51 379/266.07 |
| 5,621,790 A | 4/1997 | Grossman et al. | |
| 6,282,281 B1 | 8/2001 | Low | |
| 8,358,771 B1 | 1/2013 | Moore et al. | |
| 8,718,264 B2 * | 5/2014 | Mitchell | H04M 3/2272 379/100.06 |
| 8,793,490 B1 | 7/2014 | Szwalbenest | |
| 2006/0013140 A1 * | 1/2006 | Pushparaj | H04M 3/42263 370/241 |
| 2006/0221941 A1 * | 10/2006 | Kishinsky | H04M 3/523 3/523 |
| 2007/0283171 A1 | 12/2007 | Breslin et al. | |
| 2008/0043984 A1 * | 2/2008 | Gandhi | H04M 3/42365 379/265.03 |
| 2011/0116618 A1 * | 5/2011 | Zyarko | H04M 3/5158 379/266.07 |

* cited by examiner

*Primary Examiner* — Amal S Zenati
(74) *Attorney, Agent, or Firm* — Hunton Andrews Kurth LLP

(57) ABSTRACT

Systems and methods for unified calling are disclosed. According to one embodiment, the method may include (1) using a soft phone application executed by a computer processor, communicating, to a telephony server, an agent status indicating a readiness of the agent to manually make a telephone call; (2) receiving, on a computer terminal, an indication of a telephone number to call; and (3) manually dialing the telephone number using a telephone. The soft phone application emulates an analog connection with the telephony server.

17 Claims, 7 Drawing Sheets

SYSTEM AND METHOD FOR UNIFIED CALLING

RELATED APPLICATIONS

This patent application is a Continuation of U.S. patent application Ser. No. 13/446,173, filed Apr. 13, 2012, now U.S. Pat. No. 9,124,700 which claims priority to U.S. Provisional Patent Application Ser. No. 61/592,042, filed Jan. 30, 2012, the disclosure of each of which is incorporated by reference in its entirety.

BACKGROUND OF THE INVENTION

1. Field of the Invention

The present invention generally relates to systems and methods for unified calling over communication channels.

2. Description of the Related Art

Companies, marketing services, debt collection agencies, etc. often employ the services of auto-dialers in order to market new products to current and potential customers. There are generally two modes of using auto-dialers: "predictive" mode and "preview" mode. In predictive mode, the dialer attempts to predict the probability a customer will answer the phone in order to maximize the number of outbound call attempts made in any given period. To do this, the dialer automatically calls several numbers in advance and transfers calls to agents only when a "live" person answers the call. This type of dialing eliminates busy signals, answering machines, etc. and minimizes agent downtime.

In preview mode, however, the dialer displays contact information to an agent before placing the call. The system may be given control, or may allow the agent to control when and if a call is placed to a recipient. If a person answers, the agent is linked to the customer immediately.

SUMMARY OF THE INVENTION

Systems and methods for unified calling are disclosed.

According to one embodiment, a method for unified calling is disclosed. The method may include (1) using a soft phone application executed by a computer processor, communicating, to a telephony server, an agent status indicating a readiness of the agent to manually make a telephone call; (2) receiving, on a computer terminal, an indication of a telephone number to call; and (3) manually dialing the telephone number using a telephone. The soft phone application emulates an analog connection with the telephony server.

In one embodiment, the telephone and the telephony server are electrically isolated from each other.

In one embodiment, the telephone number may be provided by a campaign manager.

The method may further include providing a disposition of the telephone call to a database.

The method may further include validating the telephone number dialed on the telephone against a whitelist of known telephone numbers stored in a database. In another embodiment, the method may further include validating the telephone number dialed on the telephone against a blacklist of telephone numbers stored in a database.

According to another embodiment, a system for unified calling may include a computer processor executing a soft phone application on an agent terminal; a telephony server in communication with the agent terminal and the digital communication processor; a campaign manager executing a calling campaign; and an agent telephone. The soft phone application may provide an agent status to the telephony server by emulating an analog connection with the telephony server. The campaign manager may provide, to the agent terminal, a telephone number for the agent to dial on the agent telephone. The telephone and the telephony server may be electrically isolated from each other.

The system may further include a gateway in communication with the agent terminal and the telephony server, the gateway converting a signal from the agent terminal in a first format to a second format for the telephony server. The first format may be a VOIP format, and the second format may be a Time Division Multiplexing (TDM) format.

In one embodiment, the agent telephone may access a database having stored thereon a whitelist of known telephone numbers that are checked against the telephone number dialed by the agent. In another embodiment, the agent telephone may access a database having stored thereon a blacklist of known telephone numbers that are checked against the telephone number dialed by the agent.

In still another embodiment, a system for unified calling, may include a computer processor executing a soft phone application on an agent terminal; a telephony server in communication with the agent terminal and the digital communication processor; a campaign manager executing a calling campaign; a configurable communication link between the telephony server and an external phone network, wherein the configurable communication link electrically connects the telephony server and the external phone network in a first configuration, and electrically isolates the telephony server and the external phone network in a second configuration. The soft phone application may provide an agent status to the telephony server by emulating an analog connection with the telephony server. The campaign manager may provide, to the agent terminal, a telephone number for the agent.

In one embodiment, the telephony server may automatically dial the telephone number provided by the campaign manager if the configurable communication link is in the first configuration. In another embodiment, the agent may dial the telephone number provided by the campaign manager if the configurable communication link is in the second configuration.

The system may further include a database that stores data about the calling campaign. The database may further store call disposition data.

The system may further include a second communication channel for contacting the telephone number. The second communication channel may be a SMS channel, a voice channel, etc.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
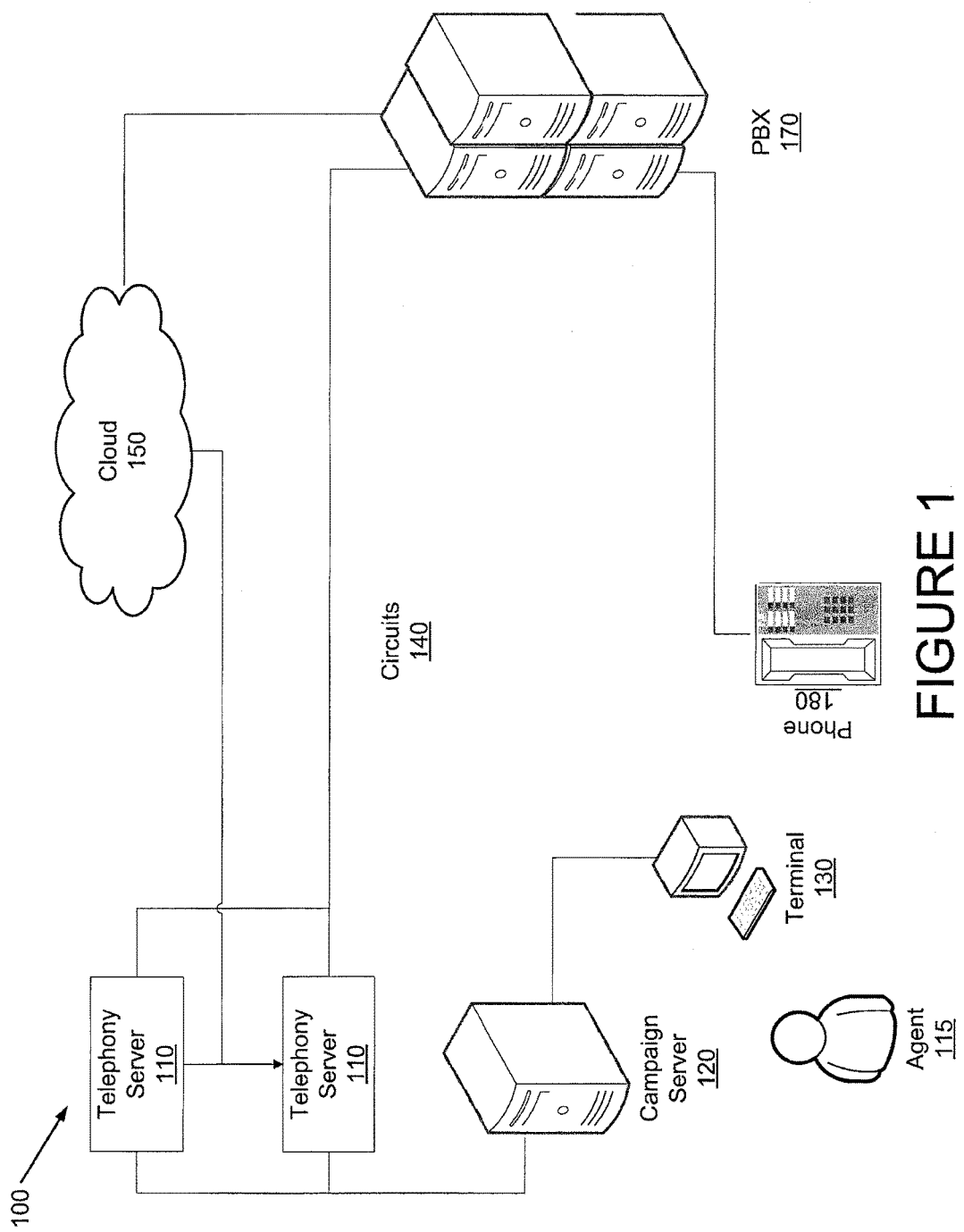
FIG. 1 is an illustration of a system for automated calling.

Several embodiments of the present invention and their advantages may be understood by referring to FIGS. 1-7, wherein like reference numerals refer to like elements.

The following disclosures are related to the present invention: U.S. Pat. No. 5,621,790; U.S. patent application Ser. No. 11/763,030; U.S. patent application Ser. No. 11/610,289; U.S. patent application Ser. No. 12/839,693; and U.S. Provisional Patent Application Ser. No. 61/317,091. The disclosure of each is specifically incorporated by reference in its entirety.

Under the Telephone Consumer Protection Act of 1991, as well as regulations issued by the FCC, entities are prohibited from calling a wireless number, without prior consent or in the event of an emergency, using an "automatic telephone dialing system" to make the call. According to the regulations, the terms "automatic telephone dialing system" and "auto dialer" mean "equipment which has the capacity (A) to store or produce telephone numbers to be called using a random or sequential number generator; and (B) to dial such numbers." 47 U.S.C. § 227(a)(1).

Referring to FIG. 1, a system and method for unified calling is provided. System 100 includes telephony server 110, campaign management server 120, terminal 130, cloud 150, Private Branch Exchange (PBX) 170, and telephone 180. Agent 115 accesses telephony server 110 via server 120. Depending on the campaign mode (e.g., predictive, preview, etc.), agent 115 may be presented with the number to call suggested by software executed by campaign management server 120 or telephony server 110 on terminal 130. An example campaign management system is disclosed in U.S. Pat. No. 5,621,790, the disclosure of which is hereby incorporated by reference in its entirety.

Additional equipment, such as multiplexers (not shown) may be used as necessary and/or desired.

In one embodiment, telephony server 110 may simply be a dialer that dials the requested number. One or more telephony server 110 may be provided.

In one embodiment, telephony server 110 may provide the agent state, circuit state, call analysis state, and may provide digital voice messages.

In one embodiment, telephony server 110 may comprise a Digital Communications Provider (DCP) and a Telephony Adapter (TA). Suitable examples of these devices are available from Aspect Software, Inc.

When agent 115 instructs telephony server 110 to dial the number, telephony server 110, via circuits 140, places the call using PBX 170. PBX 170 connects to the intended caller through cloud 150. The call is then handled by agent 115 using phone 180.

In system 100, because it has connections with telephony components 150, 170, and 180, telephony server 110 may be "capable" of making a telephone call. In one embodiment, to comply with the statute, this capability may be eliminated. This may be accomplished by, for example, removing the auto dialer from the telephony/PBX and adjuncts; removing the ability for the auto dialer to make manual or automated calls or it's dialer adjuncts; removing any Time Division Multiplexing (TDM) connectivity to the public switched telephone network (PSTN) or PBX from dialer; removing any capacity linking the dialer to outside network; and by creating an internal SIP endpoint to only allow internal circuitry connectivity and broker internal dial tone.

Figure 2:
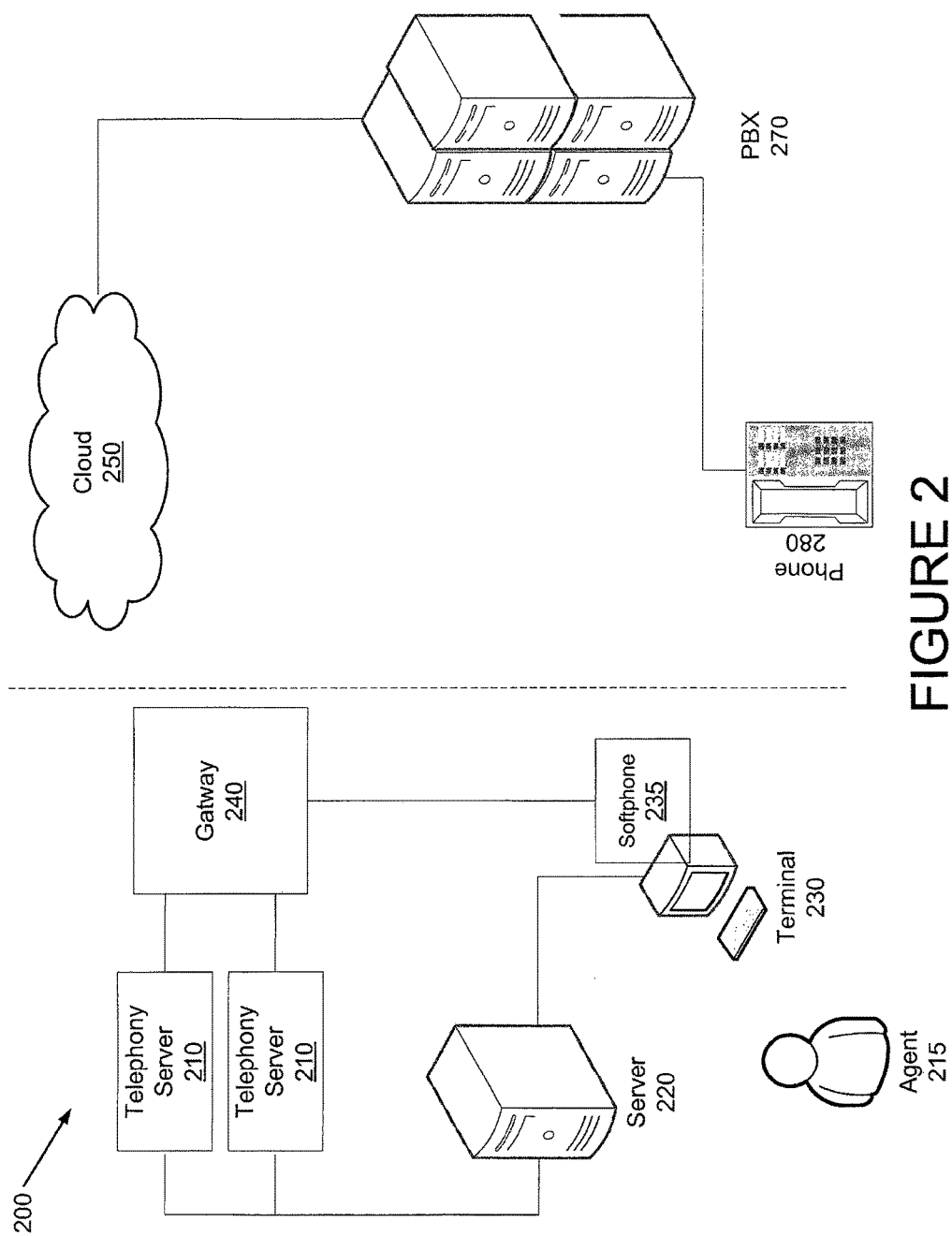
FIG. 2 is an illustration of a system for unified calling according to one embodiment.

Referring to FIG. 2, a system and method for unified calling according to one embodiment is provided. Note that in FIG. 2, telephony server 210 is isolated (e.g., physically separated) from telephony components, such as cloud 250, PBX 270 and phone 280.

System 200 includes gateway 240 and soft phone 235. Soft phone 235 may be an application (e.g., an application programmable interface ("API), an adapter, etc. that mimics a telephone's operation. In one embodiment, soft phone 235 may be an application executed on terminal 230. In another embodiment, soft phone 235 may be an application executed by a separate device (not shown).

In one embodiment, soft phone 235 may not require a speaker, microphone, etc. as it is provided simply to initiate contact with telephony server 210 via gateway 240.

In one embodiment, to use soft phone 235, agent 215 may indicate, for example, by clicking a button on the screen, that he or she is ready for the next telephone number. Any suitable interface, such as touching a screen, pressing a key on an input device (e.g., a keyboard, mouse, etc.) may be used as necessary and/or desired.

In one embodiment, the interface may be user-configurable.

Gateway 240 may be used to interface soft phone 235 with telephony server 210. In one embodiment, gateway 240 may be an audiocodec gateway that converts VOIP (digital signal) to TDM (analog signal).

In one embodiment, gateway 240 provides a session initiation protocol (SIP) connection that may emulate an analog connection between soft phone 235 and telephony server 210. By emulating this analog connection, telephony server 210 is informed that agent 215 is ready for the next call, thereby causing campaign management server 220 to provide agent 215 with information concerning the next suggested number to call. When agent 215 calls the next suggested number, the call is physically separated from telephony server 210.

In one embodiment, gateway 240 may include a web GUI to administer the SIP connection.

Gateway 240 may interface with soft phone 235 via a network, such as a local area network (LAN), wide area network (WAN), etc. Other connections may be used as necessary and/or desired.

Gateway 240 may interface with telephony server 210 via a network connection. For example, gateway 240 and telephony server may interface by a T1 connection.

In one embodiment, system 200 may further include a camera or other device (not shown) that allows campaign management server 220 and/or telephony server 210 to monitor the numbers dialed by agent 215 using telephone 280. Note that, in one embodiment, this may be an optical monitoring system to maintain the separateness of telephony server 210 and telephony components 250, 270, and 280.

In another embodiment, a microphone (not shown) may monitor the key tones on phone 280 as the number is dialed.

In still another embodiment, the number being dialed by phone 280 may be verified. For example, phone 280, PBX 270, or another device (not shown) may check the number being dialed against a whitelist, a blacklist, historical reports, and/or a database of customer phone numbers. Other techniques for reducing or minimizing misdialed numbers may be used as necessary and/or desired.

If the dialed number does not match the number suggested by telephony server 210 and/or campaign management server 220, a warning, message, sound, etc. may be provided to agent 215. In one embodiment, the phone may be prohibited from placing the call.

In one embodiment, a connection may be provided to allow the agent to later use telephony server 210 in normal preview, predictive, or any other automated mode. For example, in one embodiment, a cable (not shown) may be used to connect telephony server 210 to telephony components, such as cloud 250, so that telephony server 210 may automatically dial the number. In another embodiment, a device that can provide electrical isolation between telephony server 210 and telephony components (e.g., cloud 250, PBX 270), such as a switch (not shown) may be provided as necessary and/or desired.

Figure 3:
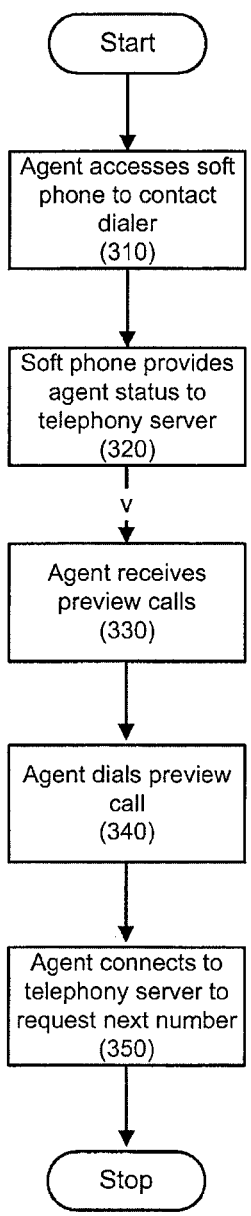
FIG. 3 is a flowchart depicting a method for unified calling according to one embodiment.

Referring to FIG. 3, a method for unified calling is provided. In step 310, the agent accesses a soft phone to contact a dialer, such as a telephony server. Telephony server may include both a dialer and a server that may operate in manual, preview, or predictive mode. Other types of telephony servers may be used as necessary and/or desired.

In one embodiment, the telephony server is isolated from telephony components and cannot place a call.

In step 320, the soft phone may provide the agent status (e.g., agent available, agent not available, busy, connected, chatting, engaged, working, etc.) to the telephony server. In one embodiment, the soft phone may connect to a gateway that then interfaces with the telephony server. At this point, the agent may then be in a mode in which preview calls may be presented on the terminal.

In one embodiment, the agent status may be provided by media type (e.g., voice, text, chat, video etc.).

In one embodiment, a separate application executed by the terminal may provide the agent status to the dialer, campaign manager, or any other component as necessary and/or desired.

In step 330, the agent may receive information concerning the next call. In one embodiment, this may be provided by the telephony server or the campaign manager.

In step 340, the agent may call the next call using a phone that is physically separate from the telephony server.

In step 350, when the agent completes the call, the agent then uses the soft phone to interface with the telephony server and receive the next number to dial. In one embodiment, the agent may indicate that the call is complete. The soft phone may then emulate the completion of the call, and prompt the telephony server and/or the campaign manager to provide the next preview call.

In one embodiment, the soft phone or a separate application may provide the agent state to the telephony server and any other component as necessary and/or desired.

In one embodiment, the agent may be presented with other communication channels to contact customers. For example, the agent may be able to communicate by SMS, chat, email, social media, video, etc. using the same or a different terminal. The agent state may be determined by an application-enabled presence, such as the soft phone.

In one embodiment, the conversation, screen movements (e.g., key strokes, mouse movements, screens viewed) may be captured for future review. In one embodiment, a separate system may be used to capture audio of the telephone call and video of the computer monitor. In one embodiment, these may be recorded and synchronized.

In one embodiment, NICE Interaction Management from NICE Systems may be used for call recording.

Figure 4:
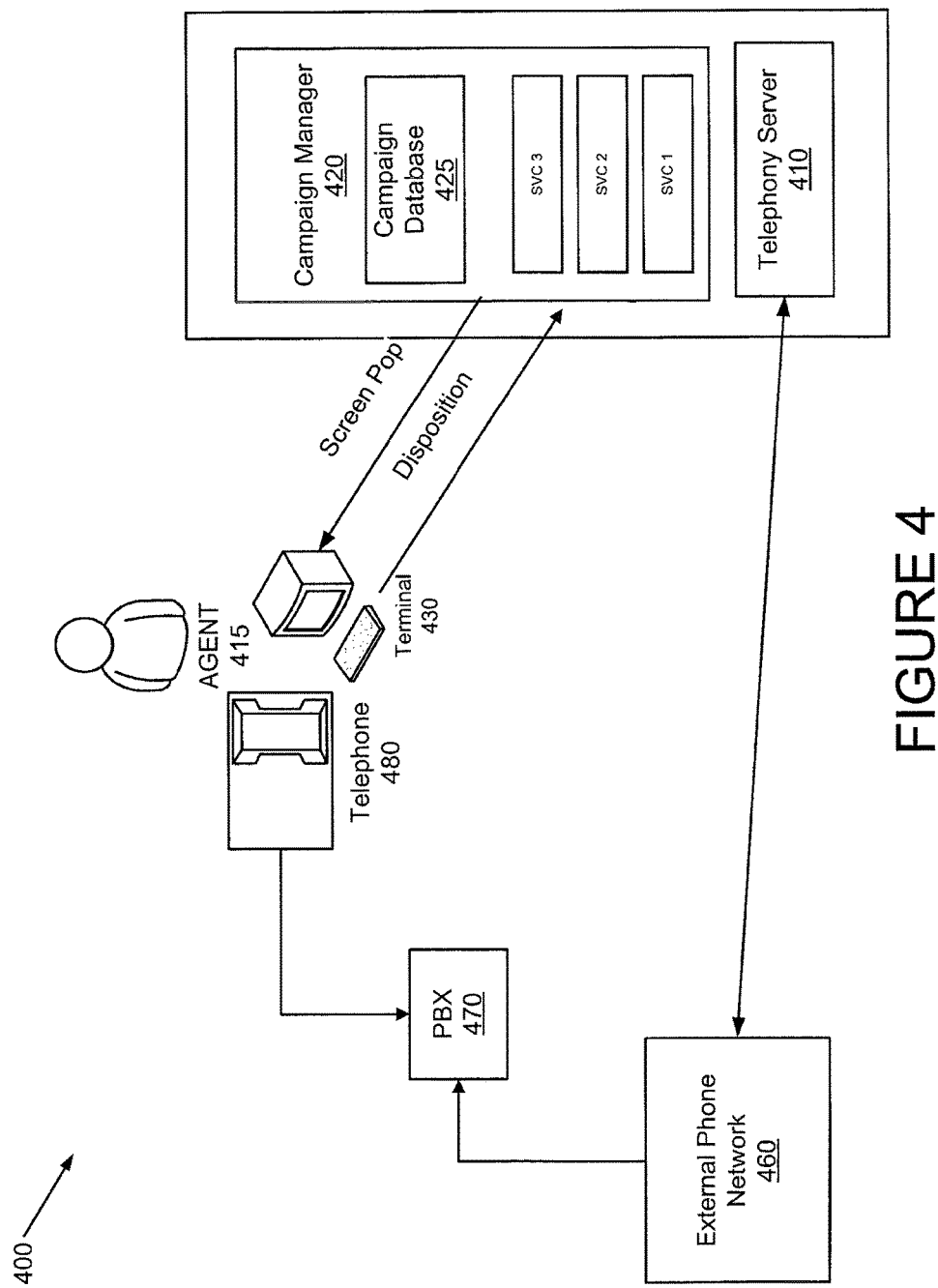
FIG. 4 is an illustration of a system for unified calling according to one embodiment.

Referring to FIG. 4, a system for unified calling according to one embodiment is provided. System 400 includes telephony server 410, campaign manager 420 (which may include campaign database 425 and services SVC1-3), terminal 430, external phone network 460, PBX 470, and telephone 480. Agent 415 may access both terminal 430 and telephone 480.

Services SCV1-3 are provided to perform services such as automated dialing, voice services, social media services, SMS services, video services, etc. Although SVC1-3 are depicted in FIG. 4, it should be recognized that a greater number or a fewer number of services may be provided.

In system 400, an automated outbound dialing service, one of SVC1-3, may be configured to disable automated dialing by telephony server 410. This may be based on the campaign type, customer type, customer preferences, customer contact type consents, business defined rules, government regulations and laws, customer service level, etc. Thus, even though there may be a communication link between telephony server 410 and external phone network 460, telephony server does not dial a telephone number.

In one embodiment, campaign manager 420 may retrieve phone records from campaign database 425 according to the current campaign. A phone number may be presented to agent 415 on terminal 430 by, for example, a "screen pop" on an agent desktop application running on terminal 430. The information presented may be similar to information that is provided in "preview mode."

In one embodiment, additional information, such as the target's name, purpose of call, script, etc. may be presented on the screen pop, or separately from the screen pop.

When automated dialing is disabled, agent 415 cannot dial the number using terminal 430. Instead, agent 415 may dial the number manually using telephone 480. At the completion of the call, agent 415 may send the disposition of the call to a database (not shown) and/or campaign manager 420, which may further provide this information to campaign database 425.

If automated dialing is not disabled, the calls may be placed by telephony server 410.

Figure 5:
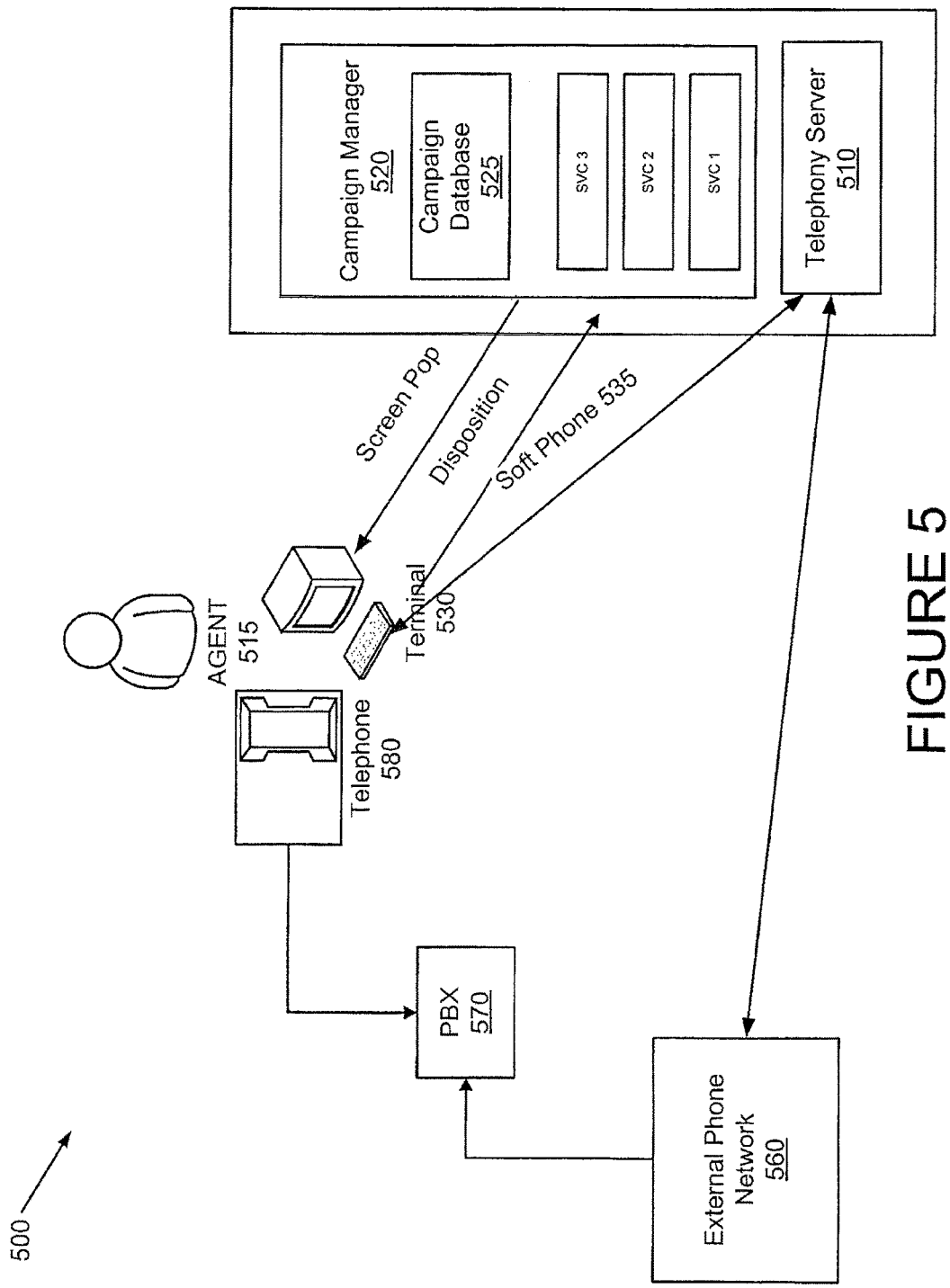
FIG. 5 is an illustration of a system for unified calling according to one embodiment.

Referring to FIG. 5, a system for unified calling according to another embodiment is provided. Similar to system 400, system 500 includes telephony server 510, campaign manager 520 (which may include campaign database 525 and services SVC1-3), terminal 530, external phone network 560, PBX 570, and telephone 580. Agent 515 may access terminal 530, telephone 580, and soft phone 535.

In system 500, automated dialing via the agent desktop on terminal 530 may be disabled. Agent 515 may use soft phone 535, as described above, to provide agent status to campaign manager 520. When telephony server 510 is given an "agent ready" status or signal from soft phone 535, it may inform campaign manager 520 that will then retrieve phone records from campaign database 525 according to the current campaign, and, as in FIG. 4, present a phone number to agent 515 on terminal 530. Agent 515 may then manually dial the number using telephone 580.

If automated dialing is not disabled, the calls may be placed by telephony server 510.

Figure 6:
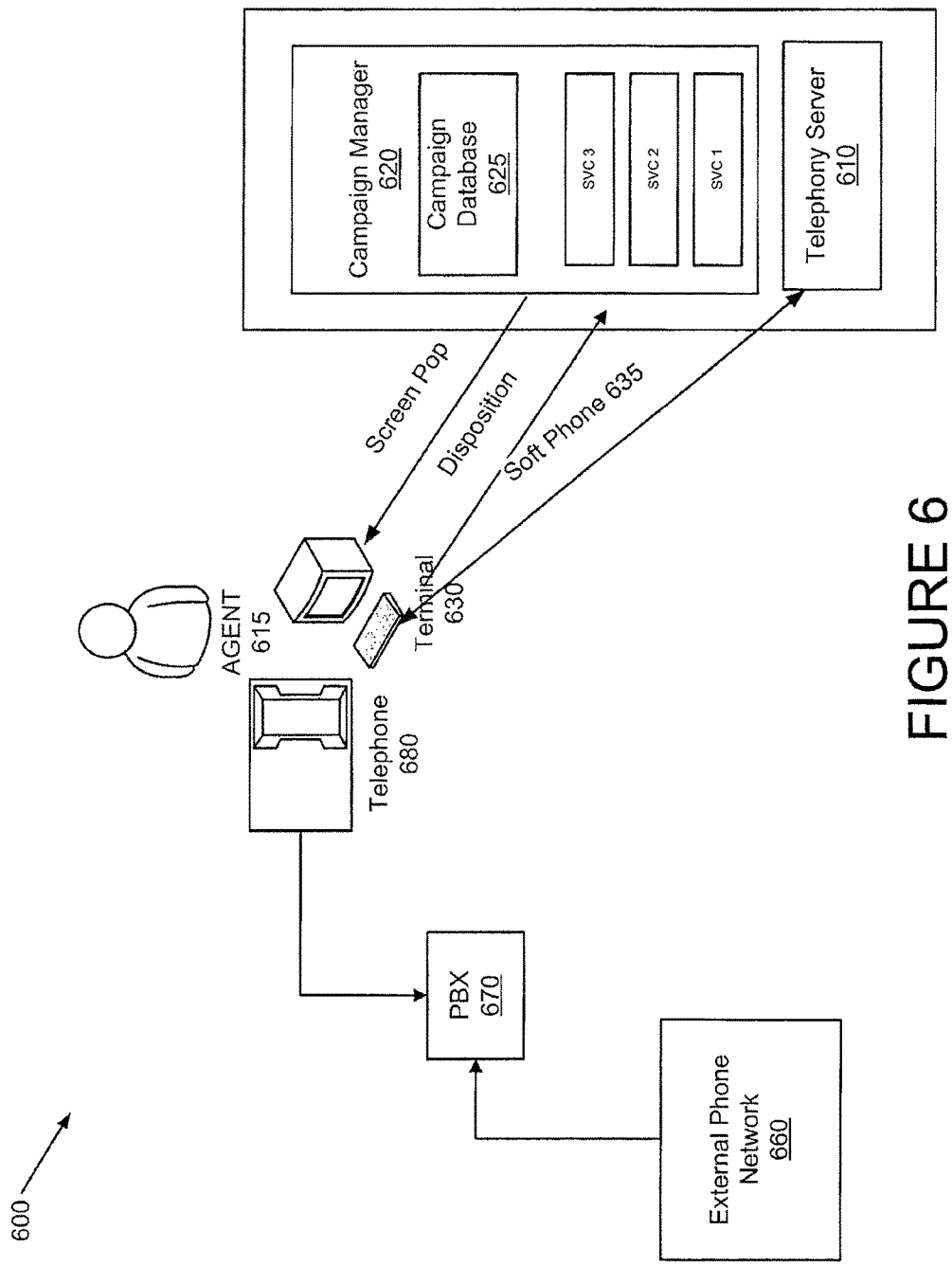
FIG. 6 is an illustration of a system for unified calling according to one embodiment.

Referring to FIG. 6, a system for unified calling according to another embodiment is provided. Similar to systems 400 and 500, system 600 includes telephony server 610, campaign manager 620 (which may include campaign database 625 and services SVC1-3), terminal 630, external phone network 660, PBX 670, and telephone 680. Agent 615 may access terminal 630, telephone 680, and soft phone 635.

In system 600, there is no communication link between telephony server 610 and external phone network 660. Thus, system 600 operates similar to system 500, but agent 615 cannot use telephony server 610 to dial a number.

Figure 7:
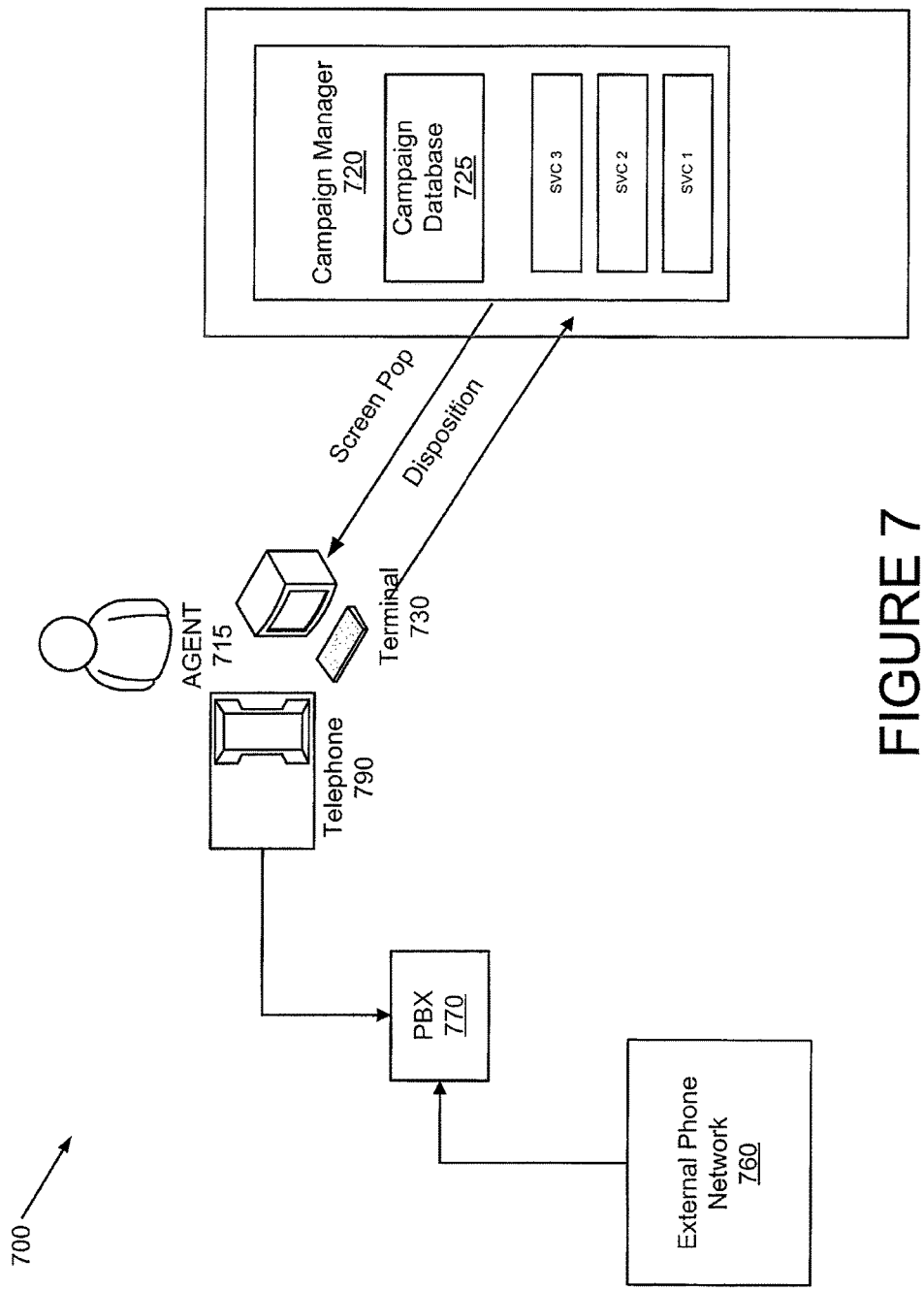
FIG. 7 is an illustration of a system for unified calling according to one embodiment.

Referring to FIG. 7, a system for unified calling according to another embodiment is provided. Similar to systems 400, 500 and 600, system 700 includes campaign manager 720 (which may include campaign database 725 and services SVC1-3), terminal 730, external phone network 760, PBX 770, and telephone 780. Agent 715 may access terminal 730 and telephone 780. System 700 does not include a telephony server or a soft phone.

Similar to system 600, campaign manager 720 may retrieve phone records from campaign database 725 according to the current campaign. A phone number may be presented to agent 715 on terminal 730 by, for example, a "screen pop" on an agent desktop. This may be similar to the "preview mode." Agent 715 may then dial the number using telephone 780, and may send the disposition to a database (not shown) and/or campaign manager 720 at the completion of the call.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ 7 operating system, the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

We claim:

1. A method for unified calling, comprising:
   a computer application executed by a computer processor at an agent terminal receiving an indication that an agent is ready to manually dial a telephone number using an agent telephone;
   the computer application communicating, to a telephony server as a signal that emulates an analog connection between the agent telephone and the telephony server, an agent status signal indicating that the agent is ready to manually make a telephone call using the agent telephone; and
   the agent terminal receiving an indication of a telephone number to call;
   wherein the agent telephone and the telephony server are electrically isolated from each other.

2. The method of claim 1, further comprising:
   providing a disposition of the telephone call to a database.

3. The method of claim 1, wherein the telephone number is provided by a campaign manager.

4. The method of claim 1, further comprising:
validating the telephone number dialed on the agent telephone against a whitelist of known telephone numbers stored in a database.

5. The method of claim 1, further comprising:
validating the telephone number dialed on the agent telephone against a blacklist of telephone numbers stored in a database.

6. The method of claim 1, further comprising:
the computer application communicating, to the telephony server, an updated agent status indicating that the agent is not ready to make a telephone call.

7. A system for unified calling, comprising:
a computer processor executing a computer application on an agent terminal;
a telephony server in communication with the agent terminal via computer application;
a campaign manager executing a calling campaign; and
an agent telephone;
wherein the computer application receives an indication that an agent is ready to manually dial a telephone number using the agent telephone;
wherein the computer application communicates, to the telephony server as a signal that emulates an analog connection between the agent telephone and the telephony server, an agent status signal indicating that the agent is ready to manually make a telephone call using the agent telephone;
wherein the campaign manager provides, to the agent terminal, a telephone number for the agent to manually dial on the agent telephone; and
wherein the agent telephone and the telephony server are electrically isolated from each other.

8. The system of claim 7, wherein the agent telephone accesses a database having stored thereon a whitelist of known telephone numbers that are checked against the telephone number dialed by the agent.

9. The system of claim 7, wherein the agent telephone accesses a database having stored thereon a blacklist of known telephone numbers that are checked against the telephone number dialed by the agent.

10. A system for unified calling, comprising:
a computer processor executing a computer application on an agent terminal;
a telephony server in communication with the agent terminal via the computer application;
a campaign manager executing a calling campaign;
a configurable communication link between the telephony server and an external phone network, wherein the configurable communication link electrically connects the telephony server and the external phone network in a first configuration, and electrically isolates the telephony server and the external phone network in a second configuration;
wherein the computer application receives an indication that an agent is ready to manually dial a telephone number using the agent telephone;
wherein the computer application communicates, to the telephony server as a signal that emulates an analog connection between the agent telephone and the telephony server, an agent status signal indicating that the agent is ready to manually make a telephone call using the agent telephone;
wherein the campaign manager provides, to the agent terminal, a telephone number for the agent.

11. The system of claim 10, wherein the telephony server automatically dials the telephone number provided by the campaign manager if the configurable communication link is in the first configuration.

12. The system of claim 10, wherein the agent dials the telephone number provided by the campaign manager if the configurable communication link is in the second configuration.

13. The system of claim 10, further comprising a database that stores data about the calling campaign.

14. The system of claim 12, wherein the database further stores call disposition data.

15. The system of claim 10, further comprising a second communication channel for contacting the telephone number.

16. The system of claim 15, wherein the second communication channel is a SMS channel.

17. The system of claim 15, wherein the second communication channel is a video channel.

* * * * *